Figure 1:
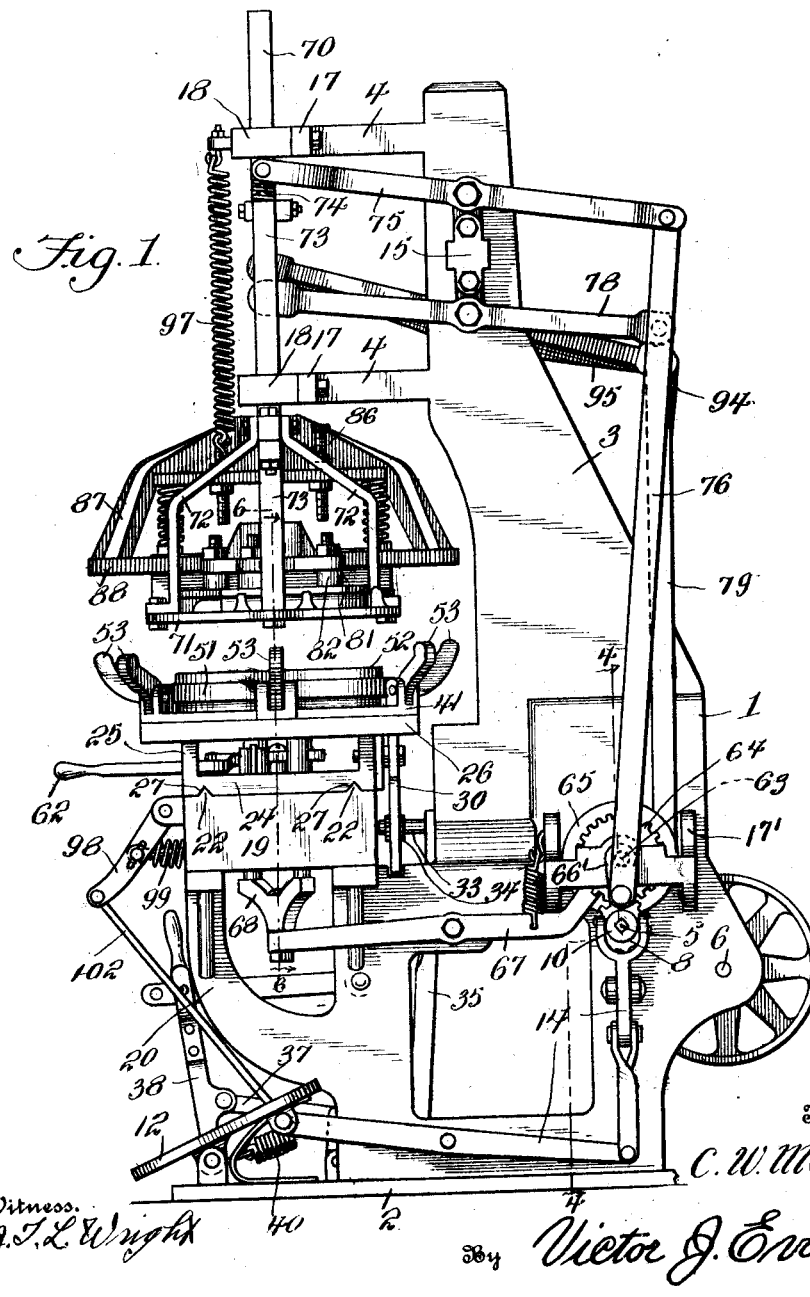

C. W. MOFFATT.
INSOLE MAKING MACHINE.
APPLICATION FILED OCT. 8, 1915.

1,198,470.

Patented Sept. 19, 1916.
7 SHEETS—SHEET 1.

Witness.
J. T. L. Wright

Inventor
C. W. Moffatt
By Victor J. Evans
Attorney

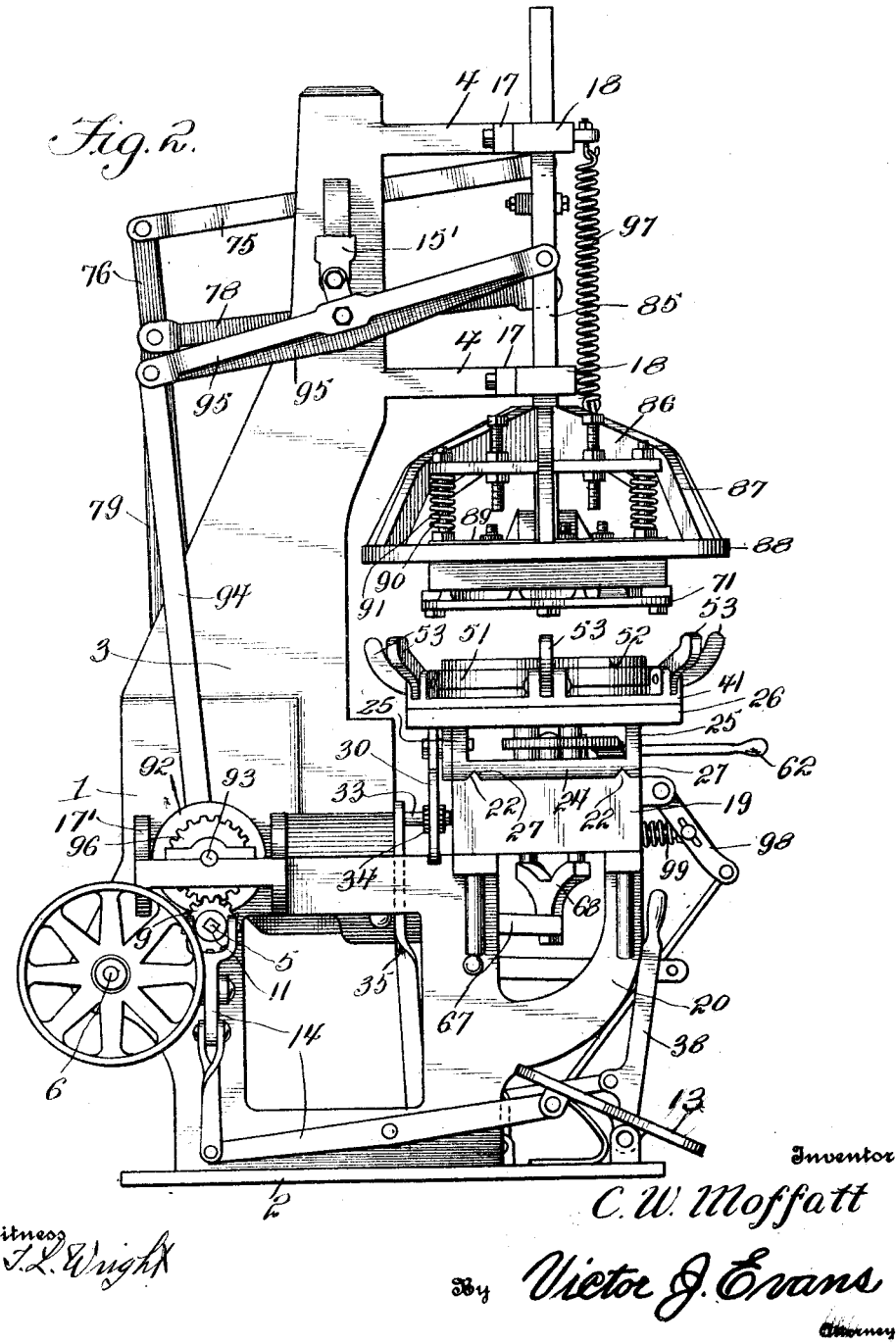

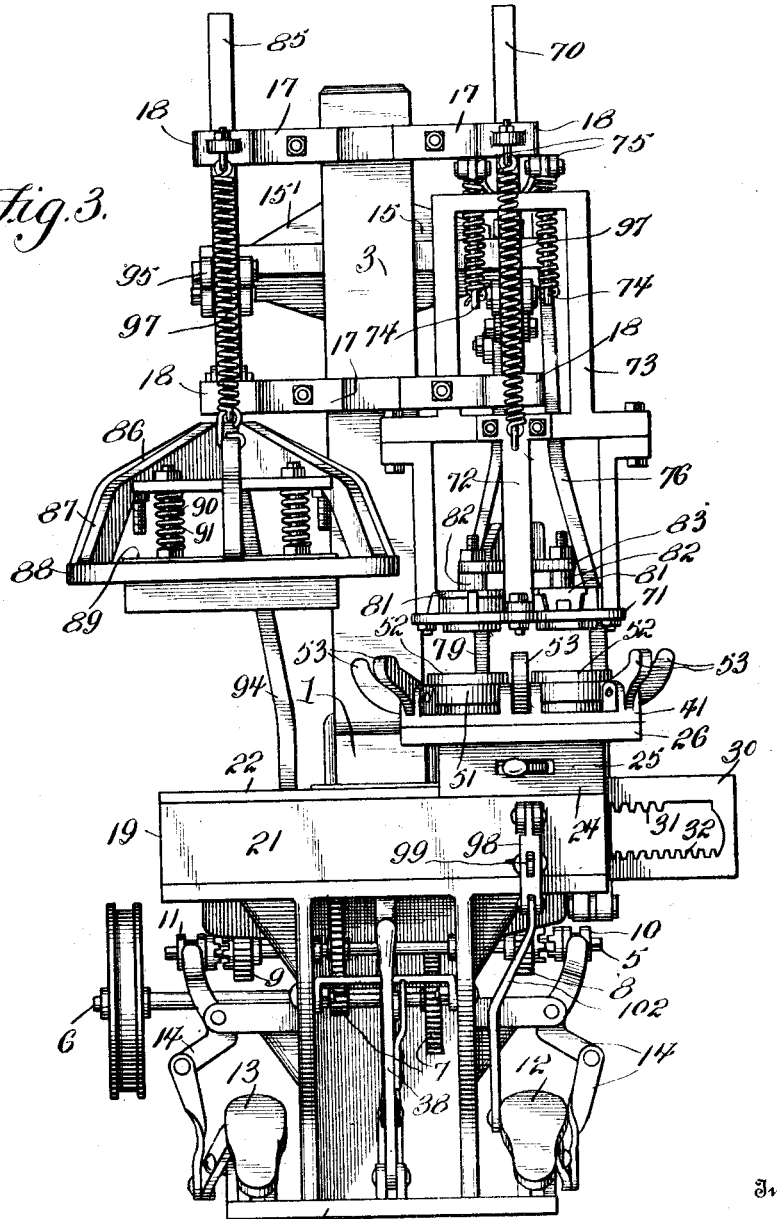

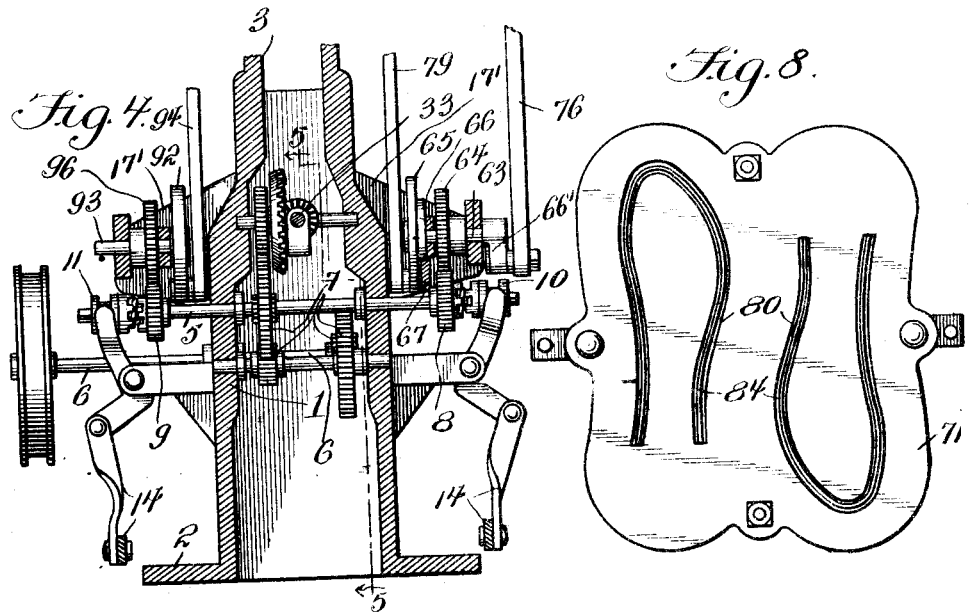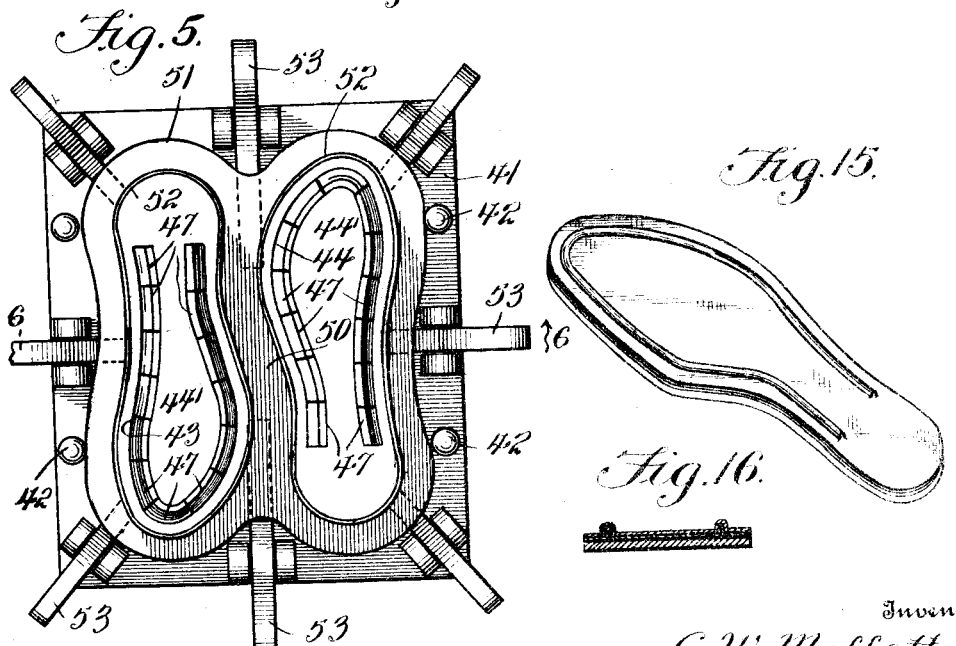

C. W. MOFFATT.
INSOLE MAKING MACHINE.
APPLICATION FILED OCT. 8, 1915.
1,198,470.
Patented Sept. 19, 1916.
7 SHEETS—SHEET 5.
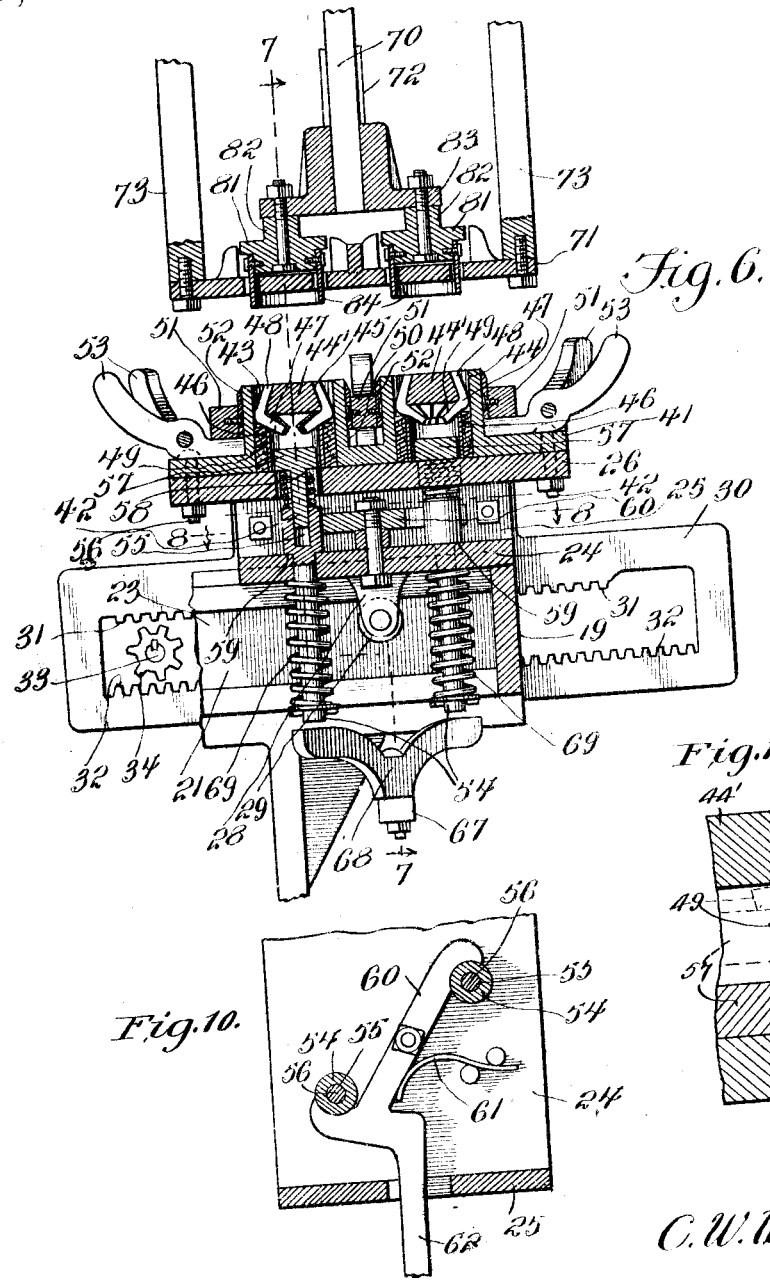
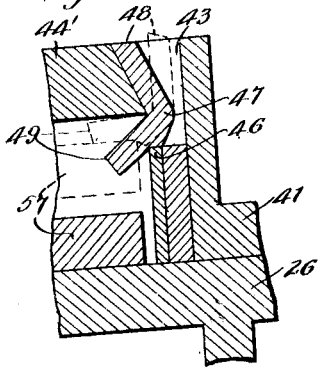
Witness
J. T. L. Wright
Inventor
C. W. Moffatt
By Victor J. Evans
Attorney C. W. MOFFATT.
INSOLE MAKING MACHINE.
APPLICATION FILED OCT. 8, 1915.
1,198,470.
Patented Sept. 19, 1916.
7 SHEETS—SHEET 6.
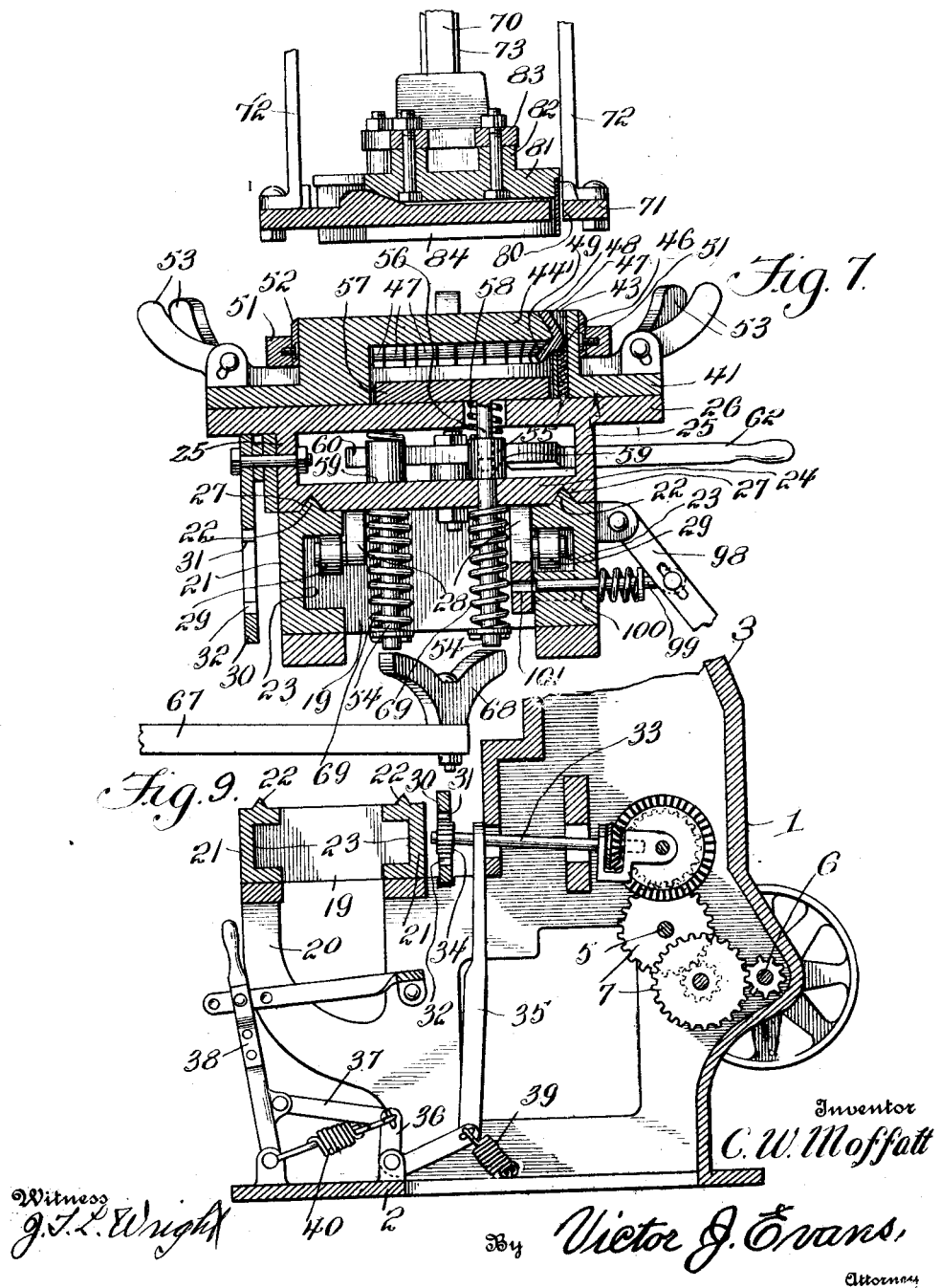
Inventor
C. W. Moffatt
Witness
J. T. L. Wright
By Victor J. Evans,
Attorney C. W. MOFFATT.
INSOLE MAKING MACHINE.
APPLICATION FILED OCT. 8, 1915.
1,198,470.
Patented Sept. 19, 1916.
7 SHEETS—SHEET 7.
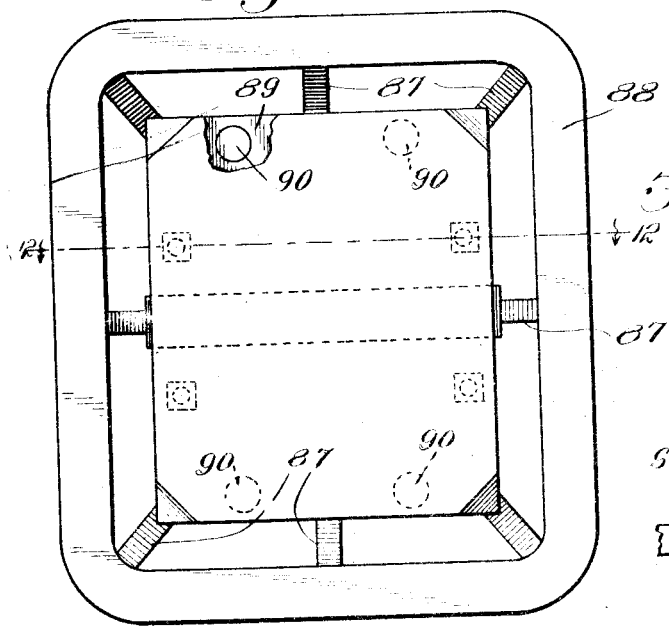
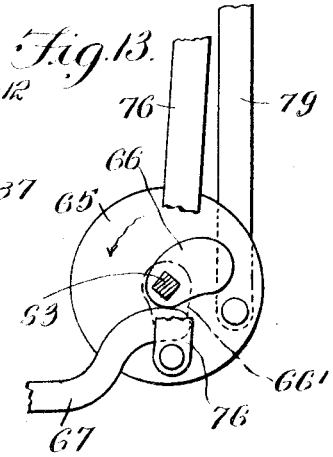
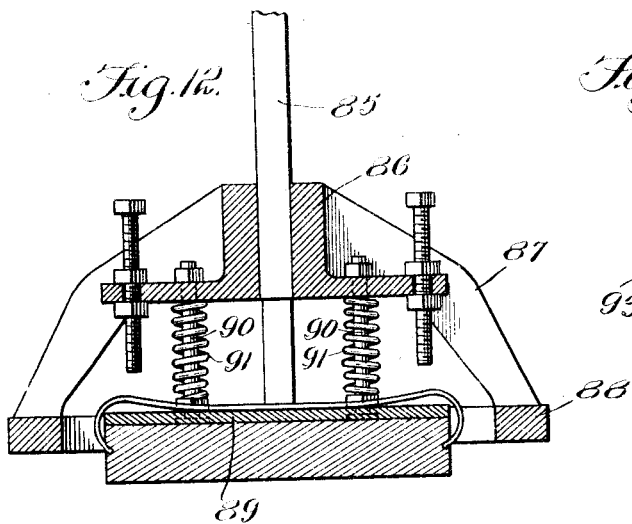
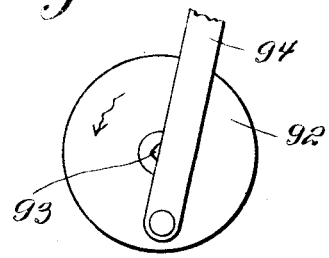
Witness
J. L. Wright
Inventor
C. W. Moffatt
By Victor J. Evans
Attorney

UNITED STATES PATENT OFFICE.

CLARENCE W. MOFFATT, OF MELROSE PARK, ILLINOIS.

INSOLE-MAKING MACHINE.

1,198,470.

Specification of Letters Patent.   Patented Sept. 19, 1916.

Application filed October 8, 1915.   Serial No. 54,803.

*To all whom it may concern:*

Be it known that I, CLARENCE W. MOFFATT, a citizen of the United States, residing at Melrose Park, in the county of Cook and State of Illinois, have invented new and useful Improvements in Insole-Making Machines, of which the following is a specification.

This invention relates to machines for making insoles of the general type in which a top of leather or analogous material is underlaid with one or more layers of fabric cemented thereto, and having a marginal ridge or wale to which other parts of the shoes may be stitched.

According to the particular embodiment of the invention illustrated in the accompanying drawings, the machine performs its function briefly in the following manner: The operator first places one or more layers of fabric over a recessed die which is arranged face upward upon a die carrier slidably mounted on stationary ways extending crosswise near the front of the machine. After the fabric is positioned the operator depresses a pedal and causes a projecting or male die to descend into the recess of the recessed die, carrying the fabric with it and consequently producing a downwardly extending ridge or wale. A presser foot or holding plate then descends upon the fabric and holds it down while the projecting die rises from the recessed die. Thereupon clamping fingers mounted in the recessed die approach the wale from the side and clamp it firmly in position. The presser foot or holding plate thereupon rises and the first part of the program of operation is complete. The operator then grasps a lever and puts into operation gearing which automatically shifts the carrier of the recessed die across the machine (in the present case toward the left) to a position which may be regarded as station No. 2. The operator then places a layer of leather or analogous substance over the fabric which is still firmly gripped in the recessed die, a suitable quantity of cement being interposed between the leather and the fabric for cementing the parts together. The operator then depresses a pedal whereupon a second presser foot in the form of a block of wood or analogous material descends upon the leather, pressing it firmly into contact with the fabric and cementing the parts together. A knife, which conforms to the outline of the finished insole, (and which in the present case is vertically slidable upon the external surface of the recessed die) then rises and cuts away the surplus material around the edges of the insole. As the knife comes from beneath, it cuts the fabric first, thus having a backing of leather against which the knife may operate as it passes through the fabric and producing a clean cut in the fabric. The knife continues to rise until it has cut through the leather whereupon the manufacture of the insole is complete. The operator then manipulates a lever which releases the clamping fingers engaging the wale and enables him to remove the insole as a finished product. The operator then again manipulates the shifting lever which causes the machine to automatically shift the carrier of the recessed die back to station No. 1 for a repetition of the program of operation. Accidental shifting of the die carrier while the operations are taking place at station No. 1 and station No. 2 is prevented by certain interlocking mechanism.

The object of my invention is to produce organized mechanism and devices and combinations of devices by means of which the above described cycle of operations may be performed.

It will be of course understood that the machine in its entirety embodies a considerable number of concepts which, so far as they go, are useful in themselves as producing single steps among the many steps which occur in the complete cycle of operation. It may be said, therefore, that in addition to the general object of the invention, there are several contributory objects which contribute toward the obtaining of the general object, but which are, in a sense, complete in themselves and result from separate concepts which will be more particularly pointed out in the accompanying claims.

In the above statement, to simplify the description, I have referred to the recessed die and to the projecting die in the singular. In the actual machine as constructed and as shown in the drawings, however, these dies are double; that is, there are two recessed dies and two coöperating projecting dies, whereby the machine is capable of simultaneously producing a pair of insoles, one right and one left.

In the accompanying drawings showing the machine in the form selected to illustrate the invention,—Figure 1 is a side elevation of the machine looking toward the left in Fig. 3. Fig. 2 is a side elevation of the machine looking toward the right in Fig. 3. Fig. 3 is a front elevation of the machine. Fig. 4 is a sectional view taken on the line 4—4, Fig. 1. Fig. 5 is a plan of the recessed die and die carrier. Fig. 6 is a transverse section showing the recessed die, die carrier and associated parts and the projecting die and first presser foot. Fig. 7 is a sectional view of the parts shown in Fig. 6, the plane of section running from front to rear of the machine. Fig. 8 is a bottom plan of the projecting die and of the presser foot or holding plate associated therewith. Fig. 9 is a sectional view taken from front to rear at the lower portion of the machine and illustrating more particularly the mechanism employed in shifting the die carrier from station No. 1 to station No. 2 and return. Fig. 10 is a detail in plan section showing the spring latch which holds the clamping fingers in the recessed die in clamping position until released by the operator. Fig. 11 is a bottom plan of the second presser foot which operates at station No. 2, and of the associated parts, particularly the knife operating frame. Fig. 12 is a sectional view on the line 12—12, Fig. 11. Fig. 13 is a detail showing the eccentrics and fragments of the associated parts which operate the projecting die, first presser foot and clamping finger mechanism. Fig. 14 is a detail showing the eccentrics which operate the pitman rod which operates the knife actuating frame and the second presser foot. Fig. 15 is a perspective of an insole produced by my machine. Fig. 16 is a transverse section of the insole shown in Fig. 15. Fig. 17 is a sectional detail showing the clamping fingers.

Similar numerals refer to similar parts throughout the several views.

In the particular construction shown in the drawings, the general frame-work or main frame 1 of the machine is provided with a base 2 from which rises an upright 3 provided near its upper end with two horizontal, forwardly projecting arms or brackets 4. These brackets form guides and supports for parts of the superstructure of the machine.

Mounted in the upright 3 is a main shaft 5 positively driven from the power shaft 6 through intermediate gearing 7. Adjacent to the opposite ends of the main shaft are loose gears 8 and 9, the gear 8 being connected to the shaft 5 through the medium of a clutch 10. A similar clutch 11 coöperates with the gear 9. Manually operated controlling elements here shown in the form of pedals 12 and 13, control the respective clutches; and a series of levers 14, form a connection between the pedals and the clutches in such manner that when either one of the pedals is depressed it will actuate the respective clutch and lock the particular gear into connection with the main shaft. Either gear 8 or 9 may thus be thrown into operation at the will of the operator.

Extending across the front of the machine is what may be termed a "bed plate" 19. This is stationary, being supported at the back by the main frame itself and at the front by braces 20 extending forward and upward from the main frame near the base thereof. According to the preferred construction, the bed plate approximates the form of a hollow rectangle as best shown probably in Fig. 9 of the drawings and on a somewhat larger scale in Fig. 7. In the design shown the bed plate includes two parallel bars 21 extending crosswise of the machine and having guides or ways 22 formed upon the top. In this particular design the bed plate consists of a single casting and has internal channels 23 running lengthwise of the casting, thus obtaining lightness combined with strength, and forming a track for anti-friction rollers 29 hereinafter mentioned.

Slidingly mounted upon the bed plate 19 is a die carrier 24 surmounted by a recessed die or pair of dies which will be hereinafter described. It is clearly shown in cross section in Fig. 7 and in another cross section (at right angles to the first) in Fig. 6. As there shown the die carrier is of box like section and has front and rear walls 25 surmounted by a platform 26 which projects beyond the lower portion in all directions. The die carrier has channels 27 in the bottom which fit over the guide ways 22 in the bed plate. It also has depending lugs 28 which carry anti-friction rollers 29, which travel upon the under side of one of the horizontal walls formed by the channels 23 in the bed plate and prevent the die carrier from rising off of the ways 22 when it is being shifted from one station to another upon the bed plate 19.

As a means for shifting the die carrier from one station to another on the bed plate, I bolt or otherwise fasten a double rack 30 to the back of the carrier, this rack extending parallel to the back of the bed plate 19 at a slight distance therefrom as clearly shown in Fig. 7. Said rack is in the form of a hollow rectangle, having two parallel inwardly projecting rows of teeth 31, 32, adapted to be engaged by the pinion 34 fastened to the shaft 33. The diameter of the pinion is small enough so that it can engage only one of these rows of teeth at a time, and as the pinion rotates in only one direction, it will shift the rack in one direction or the other, depending upon which row of teeth is engaged at the moment. The pinion may also occupy an intermediate or neutral position in which it will be out of mesh with both rows of teeth. The pinion and shaft are capable of limited vertical movement, the shaft being connected by a rod 35 to the pivotally supported angle lever 36, one arm of which is connected by a link 37 to the hand lever 38, as best shown in Fig. 9. Springs 39 and 40 are connected to opposite ends of the angle lever and operate to insure the return of the pinion 34 to the neutral or inoperative position when the operator removes his hand from the lever. Thus, by properly manipulating the lever 38 the operator may cause the pinion to engage either row of teeth and thereby shift the die carrier in either direction as desired. The upper row of teeth 31 is cut away at the right end (see Fig. 6). This means that the operator can keep his hand on the shifting lever 38 as long as he wants to without danger of wrecking the machine for the die carrier will automatically stop as soon as it has traveled sufficient distance. The row 32 however is extended to come opposite to said cut away portion and hence the pinion can be immediately thrown into mesh by shifting it toward the teeth 32.

The recessed die 41 rests upon the platform 26 of the die carrier and is fastened thereto by bolts 42 or other suitable fastening means as shown, for example, in Fig. 6. By preference the die is double so as to form a right and left insole simultaneously. In such case the two portions of the die are arranged approximately side by side as shown in Fig. 5. In the form illustrated, there are two recesses 43, 44, one for each of the insoles, these recesses being designed to receive that portion of the fabric which will constitute the ridge or wale in the finished insole. The recesses, therefore, are of the shape desired for the wale of the insole. The central portion 44¹ of the die, which is surrounded by the recess in each case, is preferably in the form of a plate or block, flat on the top and bottom, as shown in Fig. 6 and connected to the rest of the die at the heel portion as shown in Fig. 5. The upper surface of this central block is preferably flush with the upper edge of the die. The sides of said central block are upwardly convergent to afford room for the upper portions 48 of the clamping fingers 47 when the latter are in non-acting position, as shown in Fig. 6. Inwardly projecting shoulders 46 are provided within the dies and these form fulcrums for said clamping fingers, which may thus be said to be rockably mounted within the recess of the die. Said fingers are preferably in the form of angle levers, the lower portions 49 underlying the center block 44¹, and projecting downwardly and inwardly.

A recess 50 is formed between the two parts of the die, thus rendering it possible to surround each die with walls which are vertical and which consequently form guiding surfaces for the knife 52 fastened to the knife frame 51, as shown for example in Figs. 5 and 6. Thus each die is surrounded by and forms a guide for a knife, the knife being of a contour of the outer edge of the finished insole. The cutting edge of the knife is at the top and the knife when not in use is low enough so that its upper edge will be no higher and preferably a trifle lower than the upper surface of the die. The knife frame is actuated by operating levers 53 which are pivoted upon the base of the die and underlie the knife frame. The free ends of said levers project outward and upward so that they may be engaged and depressed by the actuator 88 located at station No. 2 in the machine, as hereinafter explained.

Vertically arranged push rods 54 are longitudinally slidable in the die carrier 24 and at their upper ends have enlarged sockets 55, as best shown in Figs. 6 and 7. These sockets receive and form guides for the stems 56 depending from plates 57 which underlie the tail sections 49 of the clamping fingers 47. A helical compression spring 58 surrounds each of the stems 56 and seats upon the tops of the sockets 55. The plate 57 seats upon the spring and hence is yieldingly supported upon the socket. The construction is such that when the plate rises and engages the tails of the clamping fingers the upper ends of said fingers will move outward toward the internal vertical wall of the recessed die and grip the interposed portion of the insole fabric. The rods 54 are each provided with shoulders 59 which seat upon the base of the die carrier. A latch 60, shown in detail in Fig. 10, is pivoted to the base of the die carrier and is urged by a spring 61 in such direction as to slip beneath the shoulders 59 of the push rods 54 when the latter are raised sufficiently to hold the clamping fingers in clamping position. Thus it may be stated that the clamping fingers become automatically locked in clamping position as soon as they have reached clamping position. The latch 60 has a hand lever 62 by which the latch may be released by the operator when the insole is finished.

Mounted in the lower portion of the main frame 1 is a shaft 63 to which is fastened a gear 64 which meshes with the gear 8 as shown in Fig. 4 and elsewhere. Rigidly secured to this shaft is a disk 65 which has a cam 66 formed on one side of it, the cam and disk being preferably integral. The parts are shown in detail in Fig. 13. Cam 66 is arranged to operate a lever 67, the forward or outward end of which caries a block 68 shown in Fig. 6 and 7, and elsewhere. This block engages the lower end of the push rods 54 and serves to elevate them and move the clamping fingers to clamping position at the proper moment. Compression springs 69 encircle these push rods and tend to hold them depressed in opposition to the action of the block 68.

Extending laterally in opposite directions from the upright 3 of the main frame are two auxiliary frames 15 and 15¹, best shown in Figs. 1, 2 and 3. When viewed from the front of the machine, as in Fig. 3, the frame 15 extends toward the right, and frame 15¹ toward the left. Bolted or otherwise secured to the front of the frame arms 4, previously mentioned, are brackets 17, which are provided with bearings 18 for guiding the vertically reciprocating slide rods 70 and 85. In the particular design illustrated, the slide rod 70 occupies a position at the right of the machine and the slide rod 85 a position at the left of the machine, these positions being, for convenience, herein denominated as stations Nos. 1 and 2 respectively. The slide rod 70, according to the construction illustrated, performs a dual function; one function being to operate the projecting die hereinafter mentioned, and the other being to act as a guide for the first presser foot 71 and coöperate with said projecting die and with the recessed die when the latter is at station No. 1, as indicated in Fig. 3. Presser foot 71 is here shown in the form of a plate and is connected by uprights 72 to the guide frame 73 which is slidably mounted upon the slide rod 70. Frame 73 is connected by rods 74 to the operating lever 75 fulcrumed between its ends upon the auxiliary frame 15. At its rear end said operating lever is connected by a connecting rod or pitman 76 to the crank 66¹, rigidly fastened to shaft 63 as shown in Figs. 4 and 13. Thus, when the crank rotates from initial position, it will cause the first presser foot to descend on to the upper face of the recessed die to hold the insole fabric in position thereon and will subsequently rise to permit the recessed die to be shifted to station No. 2. In the preferred construction, the frame 73 is not rigidly connected to the operating lever 75, but is yieldingly connected thereto so as not to interfere with the operation of the projecting die. This permits said die to descend and carry the presser foot with it, even though the presser foot would not, if depending upon its operating lever 75 alone, be ready to descend. By thus yieldingly supporting the frame 73, it is possible to use a plain crank for operating it, thus dispensing with accurately timed cam mechanism for operating the presser foot. This yielding connection between the frame 73 and its operating lever 75 is obtained by permitting the frame to seat upon the upper end of helical compression springs 77 which encircle said rods 74 and at their lower ends are supported upon the lower ends of the rods. This arrangement will be clearly understood by referring to the upper right portion of Fig. 3, taken in connection with the upper portion of Fig. 1.

The slide rod 70 is pivotally connected to the forward end of the operating lever 78, which is fulcrumed between its ends upon the auxiliary frame 15 and is pivotally connected at its rear end to a connecting rod or pitman 79 which is eccentrically connected at its lower end to the disk 65 as best shown in Figs. 6 and 13. The parts are so timed that the slide rod 70 which carries the projecting die 84 at its lower end will descend somewhat in advance of the presser foot 71.

The presser foot 71 has a slot 80, (see Fig. 8) conforming in size and shape to the inner wall of the recessed die 41. The func of slot 80 is to permit the projecting die to pass through the presser foot from above and at the proper time reach down into the recess of the recessed die to insert the insole fabric thereinto. Said projecting die, which is of such shape as to fit into the recess of the recessed die is fastened to a block 81 having bosses 82 formed on the back, through which they are connected to a spider 83 which is centrally apertured so as to slide upon and be guided by the upright slide rod 70.

Turning now to the mechanism at the left side of the machine, which I have designated as station No. 2: A frame 86, shown in section in Fig. 12, and in bottom plan in Fig. 11 is rigidly secured to the lower end of the vertically movable slide rod 85 hereinabove mentioned. This frame has downwardly extending arms 87, which at the lower end, carry an actuator 88 for actuating the levers 53 on the die carrier. This actuator is here shown approximately in the form of a hollow rectangle, and when it descends, engages the free ends of the levers 53 and causes them to raise the knife and cut or block out the insole. Within the area inclosed by said actuator 88 is a second presser foot, which in the preferred design, consists of a horizontal plate 89, provided with a lower facing of wood, or other suitable material, for backing up the insole when the latter is being cut or blocked to shape by the rising knife 52. Said presser foot is connected to the frame 86 by posts 90 slidably mounted on said frame and held at their downward limit of movement by springs 91. The slide rod 85 is operated through the crank disk 92, mounted upon a shaft 93, supported in an auxiliary frame 17¹, shown at the lower left portion of Fig. 2 and in Fig. 4. A connecting rod or pitman 94 is eccentrically connected to disk 92 and at the upper end is pivotally connected to the rear end of the lever 95 which is fulcrumed between its ends upon the auxiliary frame 15'. At the forward end said lever is pivotally connected to the slide rod 85 for reciprocating it. The shaft 95 has fixed thereon a gear 96 which is at all times in mesh with the gear 9 previously described.

Tension springs 97 connected at the upper ends to the topmost arm 1, through the agency of the guides 18, are here shown to be connected at their lower ends to the frames 73 and 86, respectively, to tend to hold the same normally in raised position upon the cessation of movement of the gears 64 and 96 in the operative direction.

In order to accurately position the die carrier 24 when the projecting die 84 is coöperating with it, I have provided locking mechanism which includes a lever 98 pivotally supported upon the bed plate 19 and operating a rod 99 which projects through an opening 100 in the bed plate 19, and enters a hole 101 in one of the lugs 28 as best shown near the bottom of Fig. 7. The parts are so proportioned that the hole 101 will be in line with and permit the entry of the rod 99 only when the die carrier is accurately positioned to meet the projecting die. At other times the lug 28 will lock out the rod 99 and thus prevent the movement of lever 98 to acting position. The lever 98 is connected by a rod 102 with the pedal 12 so that said pedal cannot be depressed to operate its associated clutch unless the die carrier is in proper position upon the bed plate. While this locking mechanism may be duplicated for locking the die carrier and die at station No. 2, such is not essential and may be dispensed with.

In view of the foregoing the operation of the machine will be readily understood. When the operator is ready to commence the manufacture of a pair of insoles, he lays a layer or two of fabric over each of the recessed dies; at the same time he brings the die carrier 24 to such position on bed plate 19 that the locking mechanism, including the lever 98, may engage the die carrier and hold it accurately positioned. The operator then depresses the pedal 12, causing the locking or positioning mechanism to hold the die carrier and simultaneously throwing the levers 75 and 78 into gear with the power mechanism. Thereupon, the projecting die descends, thus inserting a portion of the fabric into the recess of the recessed dies. After the fabric has been inserted by the projecting dies, the first presser foot 71 descends and holds the fabric down in position upon the surface of the recessed dies. The projecting dies then rise and clear the recessed die after which the block 48 rises, causing the push rods 54 to rise and move the clamping fingers 47 to acting position to clamp the inserted fabric against the internal sides of the recessed dies. When the sockets 55 at the upper ends of the push rods have risen sufficiently to put the clamping fingers in acting position, the latch 60 automatically slips beneath the shoulders 59 at the bottom of said sockets and thus holds the fingers in locked position. The first presser foot 71 now rises and the first part of the program of operation of the machine is completed. When the operator notices that this condition of affairs has been arrived at, he releases his foot from the pedal 12. This automatically throws out the associated clutch and retracts the locking mechanism from the die carrier. It may happen that the operator has released the pedal a moment too late or a moment too soon, but if so, this inaccuracy of operation is immediately corrected by the spring 97 which raises the frame 73 and parts supported thereon to normal initial position and holds them there until the pedal is again depressed. When this first part of the program has been completed, the operator grasps a shifting lever 38 thereby causing the pinion 34 to engage one of the rows of teeth in the rack 30 and causing said pinion to shift the rack and attached die carrier to station No. 2 at the left of the machine. There is no danger of the die carrier traveling too far, for the respective rack section which shifts the die carrier toward the left is cut away at the last or right end, and hence, the operator is free to hold the lever until the die carrier stops. When the die carrier has reached station No. 2, the operator places a layer of leather over the fabric which is still locked on to the recessed dies. Sufficient cement is provided between the leather and the fabric to hold the parts together. When these pieces of leather or other suitable material have been positioned over their respective dies, the operator depresses the pedal 12 and causes the frame 86 with its actuator 88 and second presser foot 89 to descend. The parts are so timed that the lower surface of the second presser foot will exert pressure upon the leathers before the actuator 88 commences to actuate the levers 53 which operate the knife 52. The knife will not commence to cut until the second presser foot has had time to press the leathers into firm contact with the insole fabric, but as soon as this has been accomplished, the knife will rise and block out or cut the insole.

It will be noted that the construction is such that the knife in taking the cut passes through the fabric first and the leather last. This is of great advantage, for it enables the machine to take a much cleaner cut and with less care devoted to the machine than if the knife passed through the leather first and the fabric afterward. The leather makes a good backing for the fabric while the knife is passing through the fabric and this scheme increases the life of the facing of the presser foot with which the knife co-acts.

After the cut has been taken, the insole is finished, and all that remains for the operator to do is to throw the hand lever 62 in a direction to release the push rods, thus permitting the clamping fingers to unlock and release the inserted fabric and permit the operator to lift the finished insoles from the machine. This completes the operation and the machine is ready to have the program repeated.

It will be understood that in a machine with as many component parts as mine necessarily has, the construction may be altered in many particulars without departing from the spirit of the invention. It will also be evident that some of the component devices and sub-combinations of devices may be totally omitted from the machine without thereby rendering the machine totally lacking in utility.

Having thus described my invention, what I claim as new and desire to secure by Letters Patent, is:—

1. Organized mechanism for producing a ridge or wale on an insole fabric, said mechanism having a recessed die over which the fabric may be laid, an approximately U-shaped projecting die adapted to force the fabric into the recess of the recessed die, and means part of which is within the outline of the projecting die for holding the fabric in contact with the face of the recessed die during the withdrawal of the projecting die.

2. Organized mechanism for producing a ridge or wale on an insole fabric, said mechanism having a recessed die over which the fabric may be laid, an approximately U-shaped projecting die adapted to force the fabric into the recess of the recessed die, and a presser foot for holding the fabric in contact with the face of the recessed die during the withdrawal of the projecting die, said holder plate having a slot through which the projecting die projects to reach the recess in the recessed die, and part of said holder plate lying within the periphery of the projecting die.

3. In a machine for producing a ridge or wale on an insole fabric, a recessed die over which the fabric may be laid, an approximately U-shaped projecting die adapted to force the fabric into the recess of the recessed die, die actuating means for actuating said projecting die, holding means for holding the fabric in contact with the surface of the recessed die during the withdrawal of the projecting die, said holding means being partially within the area of the projecting die, operating means for operating said holding means, and interconnecting means for correlating the die actuating means and the means for operating the holding means, whereby the projecting die will be withdrawn from the recess of the recessed die while the holding means remains in contact with the fabric.

4. In a machine for producing a wale on an insole fabric, a recessed die over which the fabric may be laid, a projecting die for inserting part of the fabric into the recess of the recessed die, fingers for clamping the inserted portion of the fabric, and means common to said projecting die and to said fingers for withdrawing the projecting die and thereupon actuating the fingers to clamp the inserted fabric.

5. In a machine for producing a wale on an insole fabric, a recessed die over which the fabric may be laid, a projecting die for inserting part of the fabric into the recess of the recessed die, fingers for clamping the inserted portion of the fabric, said fingers being movably mounted in said recessed die, a push rod for forcing said fingers to clamping position, die-actuating means for withdrawing said projecting die, and correlating means operative upon said die-actuating means and upon said push rod for actuating said push rod upon the withdrawal of said projecting die.

6. In a machine for producing a wale on an insole fabric, a recessed die, a clamping finger movably mounted therein, said clamping finger being in the form of an angle lever having one arm for coöperating with the die and a second arm arranged at an angle to the first, and means operative upon said second arm for actuating said finger.

7. In a machine for producing a wale on an insole fabric, a recessed die, a plurality of clamping fingers movably mounted in said die, said clamping fingers being in the form of angle levers having one arm which coöperates with the wall of the die to produce a clamping action and a second arm arranged at an angle to the first, and means common to a plurality of said fingers for engaging the second arms of the fingers for moving them to acting position.

8. In a machine for producing a wale upon an insole fabric, a recessed die having an internal wall, a projecting die for inserting part of the fabric into said recessed die, a clamping finger rockably mounted on said recessed die in position to directly engage the inserted portion of the fabric and hold the same between the finger and the wall of the recessed die, and means for rocking said finger toward the internal wall of the die.

9. In a machine of the class described, a recessed die, a projecting die mating with the first, and a plurality of clamping fingers in the form of angle levers, said fingers being rockably mounted on the recessed die and having one arm in position to swing toward the wall of the recessed die and a second arm, at an angle to the first, whereby said fingers may be actuated.

10. In an insole making machine, the combination of a recessed die, a projecting die mating therewith, a plurality of clamping fingers in the form of angle levers, rockably mounted within the recess of the recessed die and having one arm in position to rotate toward the outer wall of the recess in the recessed die, and the fingers having a second arm, at an angle to the first, and a movable element movable toward and from the second arm of the fingers for actuating a plurality of said fingers to move them to clamping position.

11. In an insole making machine, the combination of a recessed die, a projecting die mating therewith, a plurality of clamping fingers in the form of angle levers, rockably mounted within the recess of the recessed die and having one arm in position to rotate toward the outer wall of the recess in the recessed die and the fingers having a second arm, at an angle to the first, a movable element movable toward and from the second arm of the fingers for actuating a plurality of said fingers to move them to clamping position, a push rod for actuating said movable element, and a spring interposed between said push rod and said movable element whereby the fingers are yieldingly actuated.

12. In a machine for producing a wale on an insole fabric, a recessed die over which the fabric may be laid, a projecting die adapted to force the fabric into the recess of the recessed die, clamps for gripping the fabric within the recess of the die, clamp-actuating means, spring-pressed away from said clamps, and a releasable latch for engaging said clamp actuating means to hold said means and the clamps in gripping position.

13. In a machine for producing a wale on an insole fabric, a recessed die over which the fabric may be laid, a projecting die adapted to force the fabric into the recess of the recessed die, clamps for gripping the fabric within the recess of the die, clamp-actuating means, spring-pressed away from said clamps, a latch for engaging said clamp-actuating means, and a spring constantly urging said latch to acting position whereby said latch automatically engages said clamp-actuating means to hold it and the clamp in acting position.

14. Organized mechanism for producing a ridge or wale on an insole fabric, said mechanism having a recessed die over which the fabric may be laid, a projecting die adapted to force the fabric into the recess of the recessed die, means for holding the fabric in contact with the face of the recessed die during the withdrawal of the projecting die, and means for thereupon engaging the material within the recess of the recessed die to thereby hold the fabric in position after the means for holding the fabric in contact with the face of the recessed die has been removed.

15. In an insole making machine, a recessed die, a die carrier for said die slidable from one station to another, a projecting die at station number 1 for forcing part of an insole fabric into the recess of the recessed die, clamping means slidable with said die carrier for clamping the inserted fabric in position, and a presser foot at station number 2 for pressing leather into contact with the exposed surface of the fabric while a part of the fabric is still locked within the recess of the recessed die.

16. In an insole making machine, a recessed die, a die carrier slidable from station number 1 to station number 2, a projecting die at station number 1 for forcing part of an insole fabric into the recess of the recessed die, clamping means slidable with said die carrier for clamping the inserted fabric in position, and a knife at station number 2 fitting the sides of the recessed die for blocking out the fabric while part thereof is still clamped within the recess of the recessed die.

17. In an insole making machine, a recessed die, a die carrier slidable from station number 1 to station number 2, a projecting die at station number 1 for forcing part of an insole fabric into the recess of the recessed die, clamping means slidable with said die carrier for clamping the inserted fabric in position, and cutting means at station number 2 for blocking out the fabric while part thereof is still clamped within the recess of the recessed die, said cutting means including a knife and a block of wood or similar substance for backing up the material while the cut is being taken.

18. In an insole making machine, a recessed die, a die carrier slidable from station number 1 to station number 2, a projecting die at station number 1 for forcing part of an insole fabric into the recess of the recessed die, clamping means slidable with said die carrier for clamping the inserted fabric in position, and cutting means at station number 2 for blocking out the fabric while part thereof is still clamped within the recess of the recessed die, power mechanism for operating said projecting die, clamping means and cutting means; reversible shifting gear for shifting said die carrier from station number 1 to station number 2 and return, and means under control of the operator for, at will, connecting the power mechanism to and disconnecting it from said shifting gear.

19. In an insole making machine, a stationary main frame, a recessed die, a die carrier slidable from station number 1 to station number 2 upon said frame, a projecting die at station number 1 for forcing part of an insole fabric into the recess of the recessed die, clamping means slidable with said die carrier for clamping the inserted fabric in position, cutting means at station number 2 for blocking out the fabric while part thereof is still clamped within the recess of the recessed die, power mechanism, a pinion operated by said power mechanism, a double rack fastened to said die carrier for shifting said die carrier from station number 1 to station number 2 and return, and a manually operated lever for throwing said pinion into gear with the desired part of the rack for shifting the die carrier from one station to the other.

20. In an insole making machine, a main frame, a recessed die supported thereon, a presser foot movably mounted in said main frame to coöperate with said recessed die to hold an unblocked insole thereon, a knife mounted adjacent to said die, and means movably mounted on said machine for forcing said knife past the edge of the insole toward said presser foot to thereby block out or cut the insole to shape.

21. In an insole making machine, a main frame, a recessed die supported thereon, a presser foot movably mounted in said main frame to coöperate with said recessed die to hold an unblocked insole thereon, a knife slidably mounted upon the sides of the recessed die, and means movably mounted on said machine for forcing said knife past the edge of the insole toward the presser foot to thereby block out the insole to shape.

22. In an insole making machine, a main frame, a recesssed die supported thereon, the face of the die being upward, a presser foot movably mounted in said main frame to descend upon said recessed die to hold an unblocked insole thereon, a knife mounted adjacent to said die, levers adjacent to said knife for forcing it upward past the edges of the insole for blocking or cutting the same to shape, lever-actuating means movably mounted in said machine frame, and power mechanism for said presser foot and for said lever actuating means, said power mechanism being timed to actuate said lever-actuating means after it has actuated said presser foot.

23. In an insole making machine, a main frame, a support for an unblocked insole, said support being carried by said main frame, a presser foot mounted in said main frame and movable toward said support, a knife movably mounted on said support, said knife and said presser foot being initially on opposite sides of the unblocked sole, and means common to said knife and to said presser foot for causing them to approach insole for blocking or cutting it to shape.

24. In an insole making machine, a main frame, a recessed die supported thereon, the face of the die being upward, a presser foot movably mounted in said main frame to descend upon said recessed die to hold an unblocked insole thereon, a knife slidable upon the sides of said die, levers pivoted upon said die for forcing said knife upwardly, a presser foot provided with wood or similar substance, said presser foot being movably mounted in said machine to descend toward said die, a lever-actuating frame movably mounted upon said main frame for actuating said levers when it descends, and power mechanism common to said presser foot and to said lever-actuating frame, said power mechanism being timed to first cause the presser foot to descend and then cause the lever-actuating mechanism to descend.

25. In an insole making machine, a main frame, a recessed die supported thereon, clamping means for holding a portion of an insole fabric clamped within the recess of said die, a presser foot mounted in said main frame and movable toward the recessed die for pressing a piece of leather on to the fabric and holding it there, said presser foot having a facing of wood or similar material, and a knife mounted adjacent to said recessed die, said knife and presser foot being initially on opposite sides of the insole, whereby the knife in moving toward the presser foot first cuts through the fabric and then through the leather.

26. In an insole making machine, the combination of a main frame, a recessed die over which fabric may be laid shiftable thereon from station number 1 to station number 2, a projecting die for inserting a portion of the fabric into the recess of the recessed die, clamping means for clamping the inserted fabric, said clamping means being shiftable with said recessed die, a presser foot for holding the fabric in position upon the recessed die while the projecting die is being withdrawn, a knife adjacent to said recessed die and movable relatively thereto, a second presser foot at station number 2 for holding a layer of leather on said fabric, said second presser foot having a facing of material similar to wood, said knife and said second presser foot being initially on opposite sides of the unblocked insole, and means at station number 2 for forcing said knife toward the second presser foot.

27. in a machine for making insoles, a main frame having a die supported thereon, a coöperating die movable in said frame, a presser foot coöperating with said dies, a rotating power device, a rotating driven element connected to the presser foot for operating it, said driven element being connectible to and disconnectible from said rotating power device, and a spring yieldingly connecting said presser foot to the main frame for returning said presser foot and the driven element to initial position after said driven element has been disconnected from said power device, whereby said driven element and the presser foot will always be ready to start from initial position even though the operator has kept the driven element in engagement with the power device for somewhat more than a single cycle.

28. In a machine for making insoles, a stationary recessed die arranged face upward, a presser foot vertically movable above said die to coöperate therewith, a vertically movable projecting die above said presser foot, said projecting die being approximately U-shaped, and the presser foot having a correspondingly shaped narrow slot for permitting said projecting die to penetrate through into the recessed die, the presser foot extending within and without the area inclosed by the U-shaped projecting die, and means for yieldingly supporting said presser foot, whereby, when said projecting die is forced downward to press upon the area inside and outside of the projecting die, the presser foot will yield and descend with the projecting die.

29. In a machine for making insoles, a stationary die arranged face upward, a vertically slidable knife surrounding said die for blocking out the insole, said knife being normally below the level of said die, a lever for elevating said knife to take a cut, a presser foot above said die for backing up the material to be cut, and a vertically movable actuator for descending upon said lever to thereby actuate the knife.

30. In a machine for making insoles, a recessed die arranged face upward and adapted to have an insole fabric laid over it, means for inserting a proportion of the fabric into the recess of said recessed die, means for holding the inserted material within the recess of the die, a vertically movable presser foot adapted to coöperate with said die, a knife initially held below the upper surface of the die, levers for elevating said knife and a vertically movable actuator for actuating said levers.

31. In a machine for making insoles, a main frame, a recessed die supported upon said frame and arranged face upward, clamping means mounted within the recess of the recessed die for coöperating therewith, a knife initially supported below the upper surface of the die, a plurality of levers for elevating said knife, a vertically movable actuator slidably mounted in said main frame for simultaneously actuating a plurality of said levers to elevate said knife, and means overlying the top of the die for backing up the knife while the cut is being taken.

32. In a machine for making insoles, a main frame, a recessed die supported upon said frame and arranged face upward, clamping means mounted within the recess of the recessed die for coöperating therewith, a knife initially supported below the upper surface of the die, a plurality of levers for elevating said knife, a vertically movable actuator slidably mounted in said main frame for simultaneously actuating a plurality of said levers to elevate said knife, and a presser foot overlying the top of the die for backing up the knife while the cut is being taken, said presser foot being circumferentially inclosed within said actuator.

33. In a machine for making insoles, a main frame, a recessed die supported upon said frame and arranged face upward, clamping means mounted within the recess of the recessed die for coöperating therewith, a knife initially supported below the upper surface of the die, a plurality of levers for elevating said knife, a vertically movable actuator slidably mounted in said main frame for simultaneously actuating a plurality of said levers to elevate said knife, and a presser foot overlying the top of the die for backing up the knife while the cut is being taken, said presser foot being supported upon said actuator.

34. In a machine for making insoles, a main frame, a recessed die supported upon said frame and arranged face upward, clamping means mounted within the recess of the recessed die for coöperating therewith, a knife initially supported below the upper surface of the die, a vertically movable actuator slidably mounted in said main frame, means actuated by said actuator for elevating said knife to take a cut, and a presser foot carried by said actuator and upwardly yieldable with respect thereto for backing up the material when the cut is being taken.

In testimony whereof I affix my signature in presence of two witnesses.

CLARENCE W. MOFFATT.

Witnesses:
DAVID M. ALLEN,
FRANK M. HUSTON.